US010000401B1

(12) United States Patent
Famuagun et al.

(10) Patent No.: US 10,000,401 B1
(45) Date of Patent: Jun. 19, 2018

(54) PRODUCED WATER EVAPORATION SYSTEM

(71) Applicant: EQT IP VENTURES, LLC, Las Vegas, NV (US)

(72) Inventors: Jide Famuagun, McDonald, PA (US); Matthew G. Fox, Pittsburgh, PA (US)

(73) Assignee: EQT IP Ventures, LLC, Las Vegas, NV (US)

( * ) Notice: Subject to any disclaimer, the term of this patent is extended or adjusted under 35 U.S.C. 154(b) by 0 days. days.

(21) Appl. No.: 15/616,603

(22) Filed: Jun. 7, 2017

(51) Int. Cl.
*C02F 1/04* (2006.01)
*C02F 9/00* (2006.01)
*B01D 1/00* (2006.01)
*B01D 29/52* (2006.01)
*B01D 15/08* (2006.01)
*C02F 103/10* (2006.01)
*C02F 1/28* (2006.01)
*C02F 1/00* (2006.01)
*C02F 101/32* (2006.01)
*C02F 1/42* (2006.01)

(52) U.S. Cl.
CPC ............ *C02F 9/00* (2013.01); *B01D 1/0011* (2013.01); *B01D 15/08* (2013.01); *B01D 29/52* (2013.01); *C02F 1/004* (2013.01); *C02F 1/048* (2013.01); *C02F 1/283* (2013.01); *C02F 1/42* (2013.01); *C02F 2101/322* (2013.01); *C02F 2103/10* (2013.01)

(58) Field of Classification Search
CPC ...... B01D 1/0011; B01D 15/08; B01D 29/52; B01D 1/04; C02F 9/00; C02F 1/004; C02F 1/048; C02F 1/283; C02F 5/00; C02F 2101/322; C02F 2103/10; C02F 2103/04; C02F 1/42; C02F 2209/003; C02F 2209/01; C02F 2209/40; C02F 2301/046; E21B 43/40
USPC .......................................... 159/40, 42, 47.3
See application file for complete search history.

(56) References Cited

U.S. PATENT DOCUMENTS

| | | | | |
|---|---|---|---|---|
| 5,082,525 | A  * | 1/1992 | Travis ................. | B01D 1/0082 159/16.1 |
| 8,252,149 | B2 * | 8/2012 | Malatesta ............... | B01D 3/06 159/47.3 |
| 2007/0084802 | A1* | 4/2007 | Hilgren ..................... | A23B 4/20 210/764 |
| 2008/0237143 | A1* | 10/2008 | Hicks ...................... | C02F 1/008 210/746 |
| 2011/0083556 | A1* | 4/2011 | Duesel, Jr. ............... | B01D 1/14 95/158 |
| 2012/0145642 | A1* | 6/2012 | Bozak ................ | B01D 17/0208 210/703 |
| 2015/0166384 | A1* | 6/2015 | Fortner ..................... | F22B 1/18 122/248 |
| 2015/0368134 | A1* | 12/2015 | Hsu ........................... | C02F 9/00 210/167.11 |
| 2016/0244349 | A1* | 8/2016 | St. John ................... | C02F 9/00 |

* cited by examiner

*Primary Examiner* — Matthew O Savage
(74) *Attorney, Agent, or Firm* — The Webb Law Firm

(57) ABSTRACT

In accordance with the present invention, problems related to produced water management are addressed. The proposed produced water evaporation system incorporates several simple components in a closed system to achieve a safe and effective produced water reduction alternative that can be efficient and sustainable on active natural gas well pads.

14 Claims, 5 Drawing Sheets

PRODUCED WATER EVAPORATION SYSTEM

BACKGROUND

1. Field of the Invention

The present invention relates to a system and method for handling produced water on a natural gas production well pad.

2. Description of the Related Art

Produced water management has become a key challenge for most Exploration and Production (E&P) companies. Produced water is the water recovered from well flowback operations. There is limited demand for produced water since it can only be reused in select well completion and workover operations. Furthermore, the volume of produced water in the Appalachian Basin, for example, far exceeds the amount required for these processes. For these reasons, there is little to no demand for produced water. E&P companies are forced to transport produced fluids to disposal or recycling facilities or to shut-in wells entirely. This results in drastically increased operational costs, slowed development operations, and a complex water transport strategy.

Current technologies for produced water reduction include distillation, reduction through evaporation and solids disposal. These water reduction processes are still being developed and refined by several companies (see "Hydro Recovery", "Logic Energy Solutions", "Epiphany Water Solutions", and more). Shortcomings of many of these designs include, but are not limited to, system complexity (both mechanical and electrical), specialty parts and maintenance, small water quantities/rates, and power demands.

SUMMARY OF THE INVENTION

In accordance with the present invention, problems related to produced water management are addressed. The proposed produced water evaporation system incorporates several simple components in a closed system to achieve a safe and effective produced water reduction alternative that can be efficient and sustainable on active natural gas well pads.

BRIEF DESCRIPTION OF THE DRAWINGS

Various aspects and attendant advantages of one or more exemplary embodiments and modifications thereto will become more readily appreciated as the same becomes better understood by reference to the following detailed description, when taken in conjunction with the accompanying drawings, wherein.

DETAILED DESCRIPTION

Figure 1:
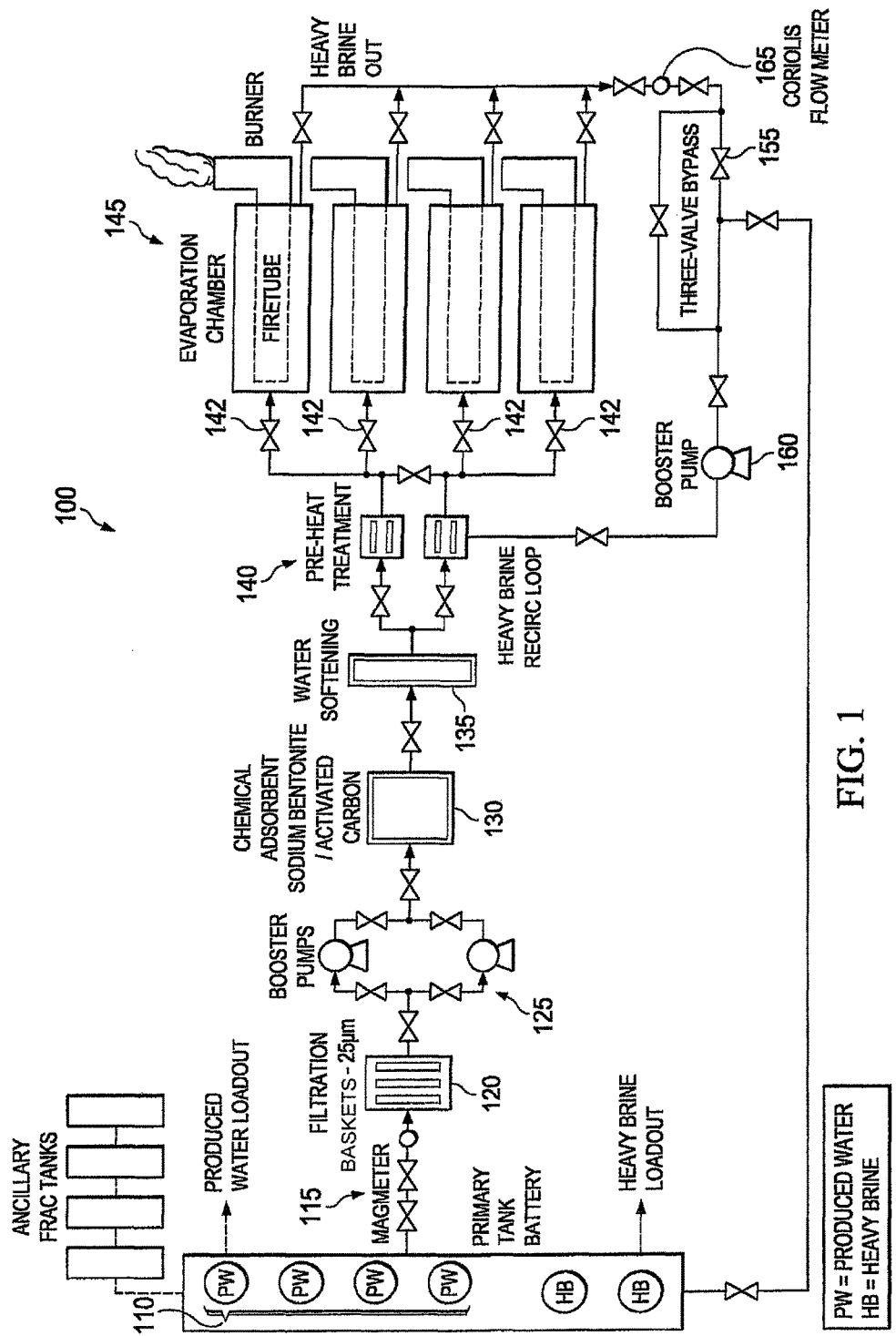
FIG. 1 is a process flow diagram of an exemplary produced water evaporation system 100.

It is to be understood that the invention is not limited in its application to the details of construction and the arrangement of components set forth in the following description or illustrated in the drawings. The invention is capable of other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "coupled," and "mounted," and variations thereof herein are used broadly and encompass direct and indirect connections, couplings, and mountings. In addition, the terms "connected" and "coupled" and variations thereof are not restricted to physical or mechanical connections or couplings.

The proposed process contrasts current systems on the market through its complete system of metering, filtration, chemical adsorption, water softening, evaporation, and/or fluid recirculation. It should be understood that, although each of those steps is a possible alternative, not every step is required for the present invention. Each step should be evaluated on a case-by-case basis regarding the influent brine stream conditions (brine profile and TDS, emissions requirements for local/state jurisdictions, etc.). The proposed process is a simple, emissions-friendly method with a no solids, "heavy brine" byproduct that can be used for recirculation into the system as well as well control and/or well completions applications when stored on location. Potential benefits include: reduced produced water volume, little to no produced water volume taken to saltwater injection wells, reduced water truck traffic on state and local roads, fewer spill incidents on roadways and residential areas, lower risk of spill incidents, reduced complexity of transportation/disposal strategies, and reduced operational costs from trucking, disposal, and spill incidents.

Referring to FIG. 1, produced water from the wells may be stored on location in a series of production tanks 110. The water may be gravity fed and metered into the evaporation system. Water metering may be accomplished using an electromagnetic flow metering device 115 (also called a "magmeter"), which is able to meter the flow of a fluid without restricting flow or affecting pressure.

After leaving the production tanks 110, the water is passed through a filter that includes filtration baskets 120 to remove any particulate debris and/or suspended solids. As shown in FIG. 1, a first pipe system is provided for conveying produced water from the produced water holding tank 100 to the filter. Two or more filtration baskets 120 are preferably installed in parallel. In a preferred embodiment, the filtration baskets filter out particles that are greater than or equal to 25 microns ($\mu m$). The filtration baskets remove non-dissolved solids in the brine stream prior to pre-heat and evaporation to improve heating efficiency and decrease potential for solids build up in valves, feed piping, on the firetube exterior, etc. After the produced water leaves the filtration baskets 120, one or more pneumatic diaphragm booster pumps 125 are used to maintain flow through the rest of the system. In a preferred embodiment, two such pumps are installed in parallel. For maintenance on the system, filtration baskets 120 may have to be periodically cleaned. Empirically, it has been shown that the filtration baskets 120 require cleaning or replacement every 10-15 days, although maintenance times may vary based on particulate density in the produced water stream, flow rates for the stream, and size of the filtration baskets 120. Installing in parallel enables redundancy and allows for the system to continue operation even while one element of the system is shut down for operational maintenance or cleaning. An example of a commercially available filter includes Filterzone P025P2S-Polypropylene Felt Filter Bag.

The produced water may be passed through a chemical adsorbent housing 130 to remove volatile organic compounds (VOCs) from the produced water stream. As shown in FIG. 1, the chemical adsorbent housing 130 is disposed in a second pipe system for conveying filtered produced water from the filtration baskets 120 to a pre-heat treatment unit 140. By using a chemical adsorption process step, up to 99 percent of VOCs may be removed from a fluid stream. An example of a chemical adsorbent housing 130 may be an activated carbon bed. Such products are commercially available from a number of suppliers, including Calgon Carbon Corporation of Moon Township, Pa.

The water may then proceed to a water softening unit 135 disposed in the second pipe system to remove any calcium (Ca2+) and/or magnesium (Mg2+) ions which can potentially lead to scaling and blockages in the system piping. The chemical adsorption and water softening may be optional. Factors that may determine whether one or both of those steps are required may include the chemical composition of the produced water, the chemical composition of the steam output, applicable regulations related to the disposal or processing of produced water, applicable regulations related to facility emissions, the degree of buildup or scale seen in equipment (often an indicator of hard water), operating requirements for the equipment used in the evaporation system, or others. The degree of chemical adsorption and/or water softening required may be determined based on an extended brine analysis (ORO, GRO, TDS, general chemistry, etc.).

The filtered produced water then continues on to pre-heat treatment unit 140 where the fluid stream is heated prior to entering the evaporation chamber 145. The inlet produced water temperature to the pre-heat treatment unit 140 is largely based on the ambient temperature and the operating temperature of the evaporation system, and the output temperature of the produced water is preferably between 120-150 degrees Fahrenheit. A burner management system ("BMS") may be used to ensure that the output temperature remains within this preferred range, regardless of the ambient or input temperatures The preheat treatment unit 140 allows the evaporation chamber unit 145 to operate more efficiently and reduce heat energy requirements and overall fuel gas consumption. Finally, the produced water proceeds from the pre-heat treatment unit 140 to the evaporation chambers 145 through a third pipe system that includes flow valves 142.

The evaporation chamber 145 can be an evaporation tank. A heater 150 is disposed for heating an inside of the evaporation tank which heats the water above the point where evaporation begins to occur. The heater 150 can include a firetube. The water is not fully evaporated in the evaporation chamber 145; empirically, it has been found that roughly 70-80 percent of the tank water on a mass flow basis may be evaporated in the evaporation chamber 145 for ideal operation. The produced water may have particulates that are suspended in the water that increase the water's density and weight. If all of the water were evaporated, then the non-evaporated particulates would cause build-up and scaling within the evaporation chamber 145, which would then necessitate periodic maintenance and potential shutdown of the system and potentially require large volumes of potentially hazardous salt disposal.

Other methods of produced water handling currently in use do fully evaporate the water, leaving only solid particulates. The present invention is different from those existing systems in that it only evaporates the water until a heavy brine remains in a fully liquid form which is removed from the bottom of the evaporation shell. As shown in FIG. 1, the heavy brine outflow may be metered and recirculated via a fourth pipe system for recirculating heavy brine from the evaporation tank to the pre-heat treatment unit and the third pipe system through the use of booster pump 160. Alternatively, as also shown in FIG. 1, the heavy brine may be sent to isolated heavy brine storage tanks for use in drilling/completions operations using the valve bypass 155.

Water has a certain capacity for retaining suspended particulates, and after reaching a certain saturation density at a specific temperature, the particulates will begin to precipitate and cause sedimentation. Experimental results have shown that if the density of the heavy brine is kept at or below 10.2 lbs/gallon, then sedimentation can generally be avoided. When the density of the water in the evaporation chamber 145 reaches approximately 10.2 lbs/gallon, then the heavy brine may be evacuated from the evaporation chamber 145 and new water from the pre-heat treatment unit 140 is allowed to flow in. A Coriolis flow meter 165 may be used to monitor the real-time density of the liquid in the evaporation chamber 145. The Coriolis flow meter can be configured to monitor at least one of the rate or volume of heavy brine recirculation.

Figure 2:
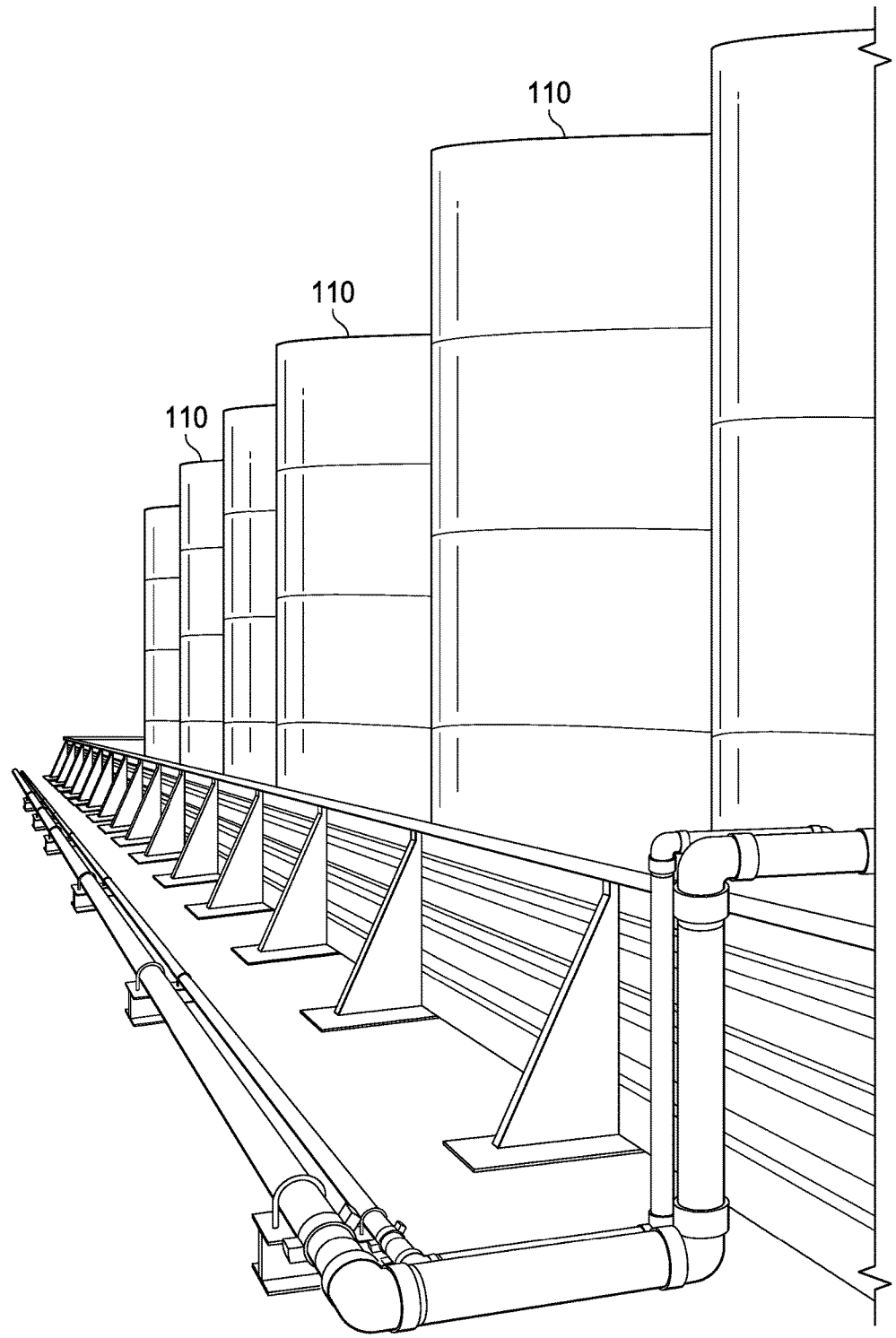
FIG. 2 illustrates a series of production tanks for use with the exemplary produced water evaporation system.

FIG. 2 illustrates a series of production tanks 110 for use with the exemplary produced water evaporation system 100.

Figure 3:
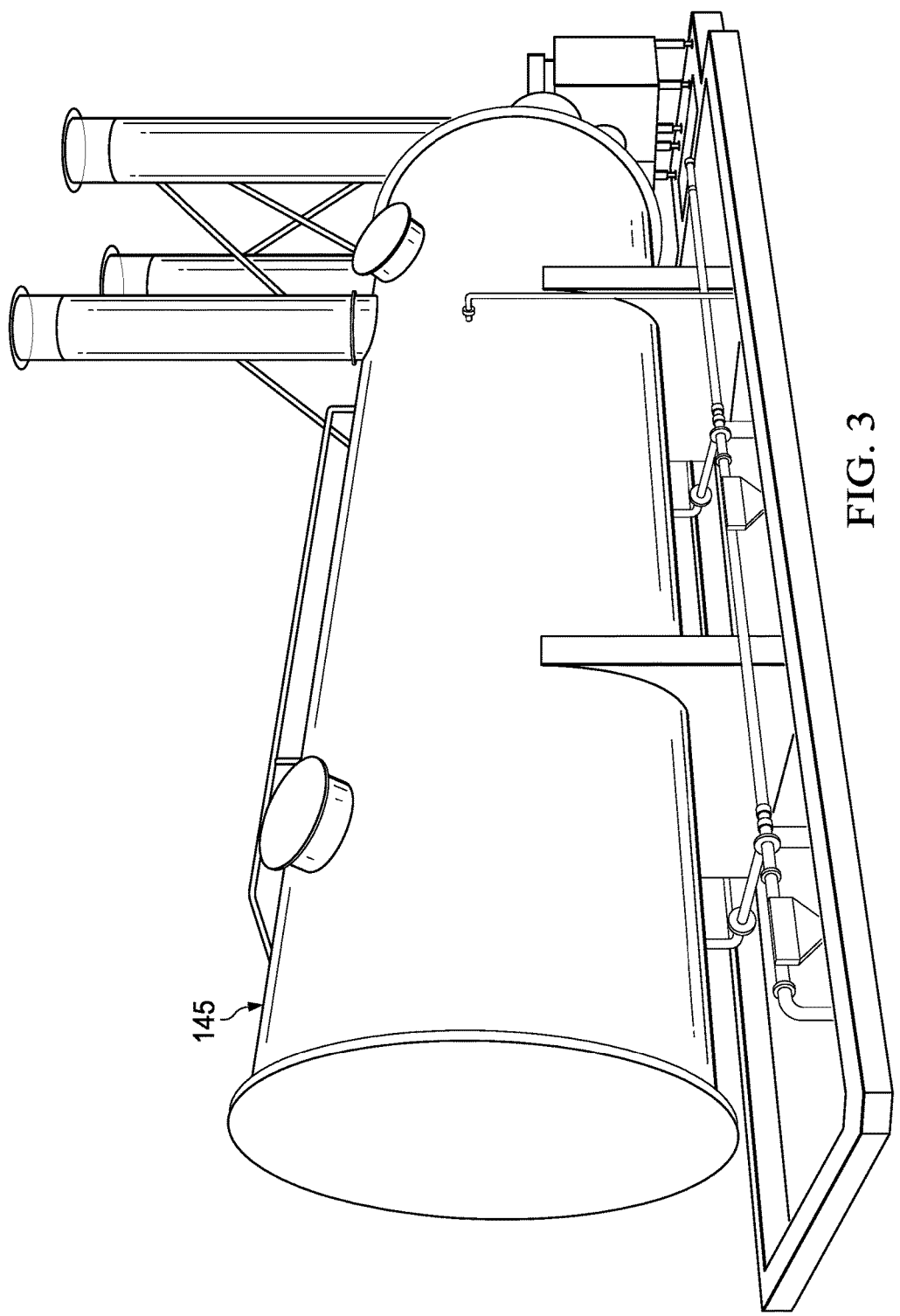
FIG. 3 illustrates an evaporation chamber for use with the exemplary produced water evaporation system.

FIG. 3 illustrates an evaporation chamber 145 for use with the exemplary produced water evaporation system 100.

Figure 4:
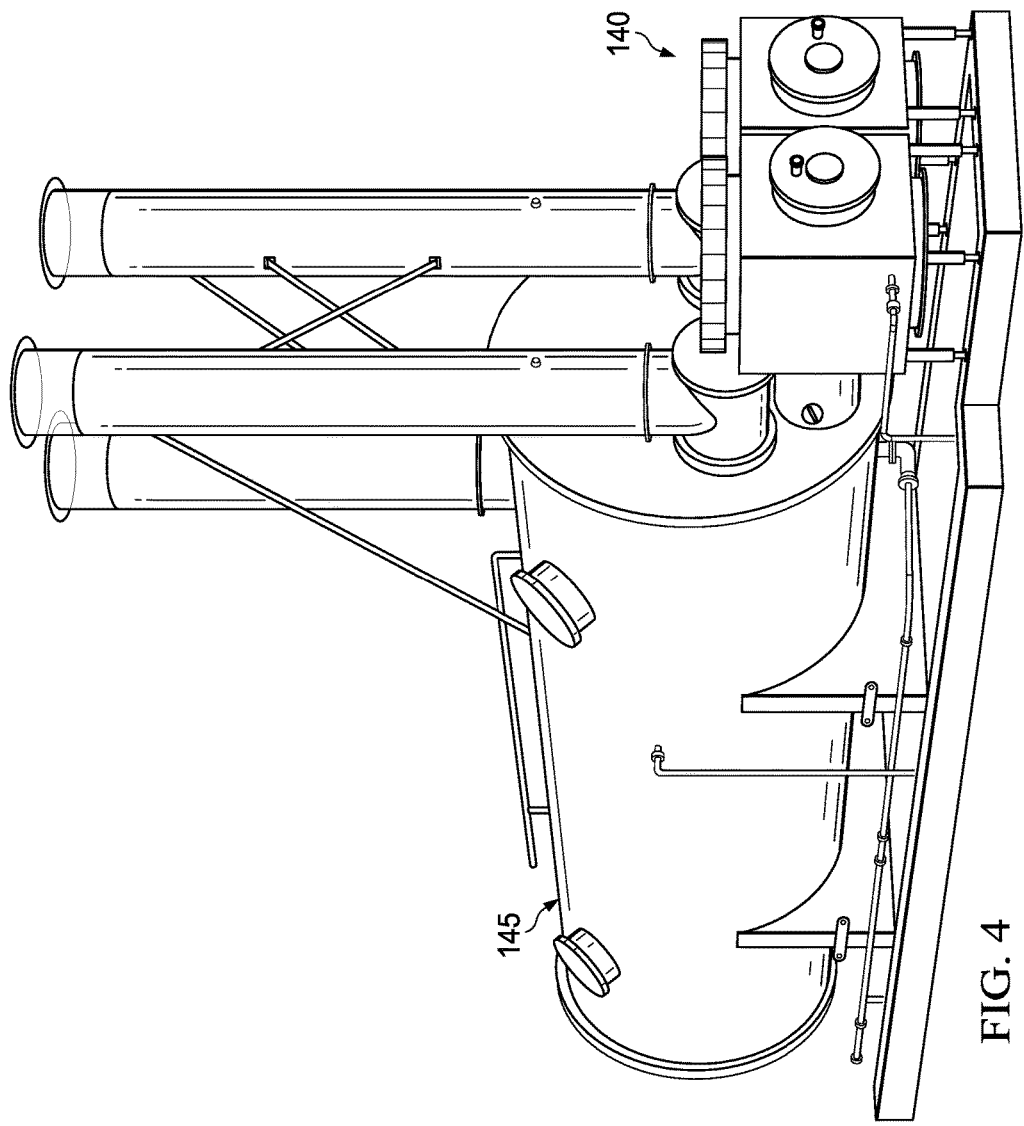
FIG. 4 illustrates an evaporation chamber with pre-heat treatment units for use with the exemplary produced water evaporation system.

FIG. 4 illustrates an evaporation chamber 145 with pre-heat treatment units 140 for use with the exemplary produced water evaporation system 100.

Figure 5:
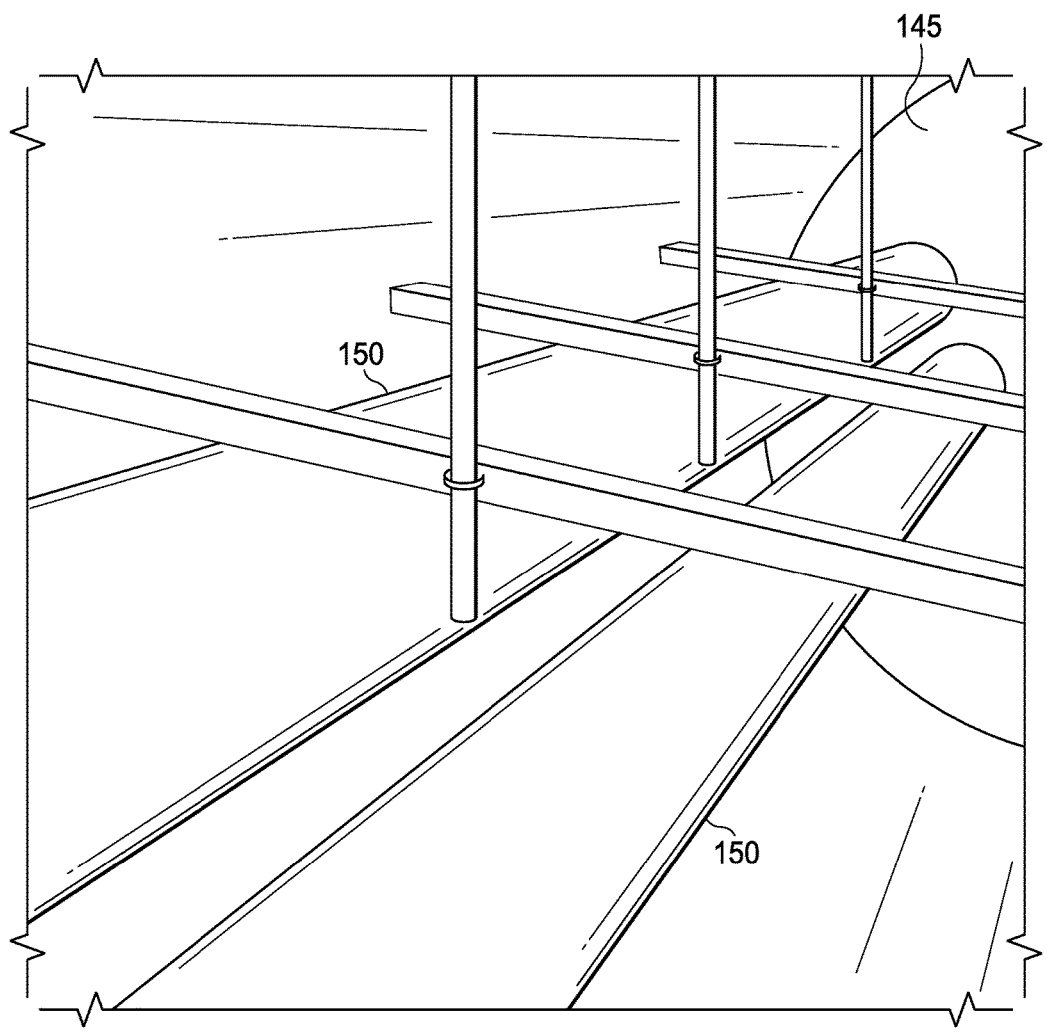
FIG. 5 illustrates firetubes in the interior of an evaporation chamber for use with the exemplary produced water evaporation system.

FIG. 5 illustrates firetubes 150 in the interior of an evaporation chamber 145 for use with the exemplary produced water evaporation system 100.

In an alternative embodiment, instead of (or in addition to) a chemical adsorbent housing 130, chemical scrubbers (not shown) may be located on the evaporation stack column for the burners 150. The chemical scrubbers may remove VOCs from the steam exhaust that passes through the evaporation stack column.

Although the concepts disclosed herein have been described in connection with the preferred form of practicing them and modifications thereto, those of ordinary skill in the art will understand that many other modifications can be made thereto. Accordingly, it is not intended that the scope of these concepts in any way be limited by the above description.

What is claimed is:

1. A produced water evaporation system, comprising:
a water holding tank;
a filter configured to receive produced water from the water holding tank and filter said produced water;
a first pipe system for conveying the produced water from the water holding tank to the filter;
a pre-heat treatment unit configured to heat the produced water that has been filtered by the filter;
a second pipe system for conveying the filtered produced water from the filter to the pre-heat treatment unit;
an evaporation tank defining an evaporation chamber, a heater disposed for heating an inside of the evaporation tank, wherein the evaporation tank is configured to receive the filtered produced water from the pre-heat treatment unit and wherein the heater is configured to further heat the filtered produced water in order to evaporate said filtered produced water until a heavy brine is formed; and a third pipe system for conveying the filtered produced water from the pre-heat treatment unit to the evaporation tank.

2. The produced water evaporation system of claim 1, wherein the filter comprises a plurality of filtration baskets connected in parallel.

3. The produced water evaporation system of claim 1, wherein the filter is configured to filter out particles greater than or equal to 25 microns in size.

4. The produced water evaporation system of claim 1, further comprising one or more pneumatic diaphragm booster pumps located in the second pipe system between the filter and the pre-heat treatment unit.

5. The produced water evaporation system of claim 4, wherein said one or more pneumatic diaphragm booster pumps comprises a plurality of pneumatic diaphragm booster pumps connected in parallel.

6. The produced water evaporation system of claim 1, further comprising a chemical adsorbent housing located between the filter and the pre-heat treatment unit in the second pipe system.

7. The produced water evaporation system of claim 6, wherein the chemical adsorbent housing comprises a bed of activated carbon.

8. The produced water evaporation system of claim 1, further comprising a water softening unit located between the filter and the pre-heat treatment unit in the second pipe system.

9. The produced water evaporation system of claim 1, wherein the pre-heat treatment unit heats the filtered produced water to a temperature between 120-150 degrees Fahrenheit.

10. The produced water evaporation system of claim 9, wherein the pre-heat treatment unit further comprises a burner management system to ensure that the filtered produced water is heated to a temperature between 120-150 degrees Fahrenheit.

11. The produced water evaporation system of claim 1, wherein the heavy brine formed by the evaporation chamber has a density equal to or less than 10.2 pounds per gallon.

12. The produced water evaporation system of claim 1, further comprising a fourth pipe system for recirculating the heavy brine from the evaporation tank to the pre-heat treatment unit, and a booster pump disposed in the fourth pipe system configured to recirculate the heavy brine through the fourth pipe system.

13. The produced water evaporation system of claim 12, further comprising a Coriolis flow meter disposed in the fourth pipe system configured to monitor the density of the produced water in the evaporation chamber.

14. The produced water evaporation system of claim 13, wherein the Coriolis flow meter is further configured to monitor at least one of the rate or volume of the heavy brine recirculation through the fourth pipe system.

\* \* \* \* \*